(12) United States Patent
Ben-Natan et al.

(10) Patent No.: US 8,141,100 B2
(45) Date of Patent: Mar. 20, 2012

(54) IDENTIFYING ATTRIBUTE PROPAGATION FOR MULTI-TIER PROCESSING

(75) Inventors: Ron Ben-Natan, Lexington, MA (US);
Ury Segal, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 11/642,432

(22) Filed: Dec. 20, 2006

(65) Prior Publication Data
US 2010/0132024 A1 May 27, 2010

(51) Int. Cl.
*G06F 15/163* (2006.01)
(52) U.S. Cl. .................. 719/313; 707/781; 726/22
(58) Field of Classification Search .................. 719/313; 707/781, 782; 726/13, 22
See application file for complete search history.

(56) References Cited

U.S. PATENT DOCUMENTS

| | | |
|---|---|---|
| 4,451,916 A | 5/1984 | Casper et al. |
| 4,611,205 A | 9/1986 | Eglise |
| 4,672,572 A | 6/1987 | Alsberg |
| 4,956,769 A | 9/1990 | Smith |
| 5,224,058 A | 6/1993 | Mickaels |
| 5,261,102 A | 11/1993 | Hoffman |
| 5,299,257 A | 3/1994 | Fuller et al. |
| 5,325,290 A | 6/1994 | Cauffman et al. |
| 5,355,474 A | 10/1994 | Thuraisngham et al. |
| 5,557,742 A | 9/1996 | Smaha et al. |
| 5,594,899 A | 1/1997 | Knudsen et al. |
| 5,606,668 A | 2/1997 | Shwed |
| 5,701,342 A | 12/1997 | Anderson et al. |
| 5,737,316 A | 4/1998 | Lee |
| 5,758,083 A | 5/1998 | Singh et al. |
| 5,825,772 A | 10/1998 | Dobbins et al. |
| 5,826,267 A | 10/1998 | McMillan |

(Continued)

FOREIGN PATENT DOCUMENTS
EP  0398645  11/1990
(Continued)

OTHER PUBLICATIONS

Ron Ben Natan, Implementing Database Security and Auditing: A guide for DBAs, information security administrators and auditors. Elsevier Digial Press (May 2, 2005). pp. 95-108, 177-201, 242-266, 278-293, 324-326, 340-391.*

(Continued)

*Primary Examiner* — H. S. Sough
*Assistant Examiner* — Brian Wathen
(74) *Attorney, Agent, or Firm* — Terry J. Carroll; SVL: IP Law

(57) ABSTRACT

A multi-tier attribute tracking mechanism identifies end user credentials and other client information and attributes and assigns them to database requests in an application server architecture. Disclosed configurations identify the processing unit, or thread, assigned by the operating system to service the incoming request from the user at the application tier. A matching of users to threads allows successive thread activity to be mapped back to the initiating user. Conventional interception of database access attempts at the application level ("server taps," or staps) identified only the database user (the account in the database) and associated connection as the responsible user. By intercepting, or "tapping" the access request at the operating system level (using kernel taps, or "ktaps"), the mechanism matches which application requests map to which database requests. With this matching, the database requests can be tagged with the user credentials which are known through the application request.

27 Claims, 8 Drawing Sheets

U.S. PATENT DOCUMENTS

| | | | |
|---|---|---|---|
| 5,828,666 A | 10/1998 | Focsaneanu et al. |
| 5,835,726 A | 11/1998 | Shwed et al. |
| 5,845,281 A | 12/1998 | Benson et al. |
| 5,848,233 A | 12/1998 | Radia et al. |
| 5,881,225 A | 3/1999 | Worth |
| 5,884,025 A | 3/1999 | Baehr et al. |
| 5,953,707 A | 9/1999 | Huang et al. |
| 5,961,582 A | 10/1999 | Gaines |
| 5,963,642 A | 10/1999 | Goldstein |
| 5,974,396 A | 10/1999 | Anderson et al. |
| 5,978,788 A | 11/1999 | Castelli et al. |
| 5,978,813 A | 11/1999 | Foltz et al. |
| 6,009,475 A | 12/1999 | Shrader |
| 6,016,491 A | 1/2000 | Kou |
| 6,044,376 A | 3/2000 | Kurtzman, II |
| 6,049,821 A | 4/2000 | Theriault et al. |
| 6,052,447 A | 4/2000 | Golden et al. |
| 6,061,797 A | 5/2000 | Jade et al. |
| 6,070,243 A | 5/2000 | See et al. |
| 6,075,926 A | 6/2000 | Atkins et al. |
| 6,076,168 A | 6/2000 | Fiveash et al. |
| 6,081,900 A | 6/2000 | Subramaniam et al. |
| 6,085,191 A | 7/2000 | Fisher et al. |
| 6,088,796 A | 7/2000 | Cianfrocca et al. |
| 6,097,399 A | 8/2000 | Bhatt et al. |
| 6,105,027 A | 8/2000 | Schneider et al. |
| 6,119,236 A | 9/2000 | Shipley |
| 6,122,403 A | 9/2000 | Rhoads |
| 6,125,447 A | 9/2000 | Gong |
| 6,151,601 A | 11/2000 | Papierniak et al. |
| 6,192,476 B1 | 2/2001 | Gong |
| 6,205,475 B1 | 3/2001 | Pitts |
| 6,226,749 B1 | 5/2001 | Carloganu et al. |
| 6,230,156 B1 | 5/2001 | Hussey |
| 6,236,996 B1 | 5/2001 | Bapat |
| 6,253,321 B1 | 6/2001 | Nikander et al. |
| 6,272,641 B1 | 8/2001 | Ji |
| 6,279,010 B1 | 8/2001 | Anderson |
| 6,298,327 B1 | 10/2001 | Hunter et al. |
| 6,304,975 B1 | 10/2001 | Shipley |
| 6,311,272 B1 | 10/2001 | Gressel |
| 6,330,562 B1 | 12/2001 | Boden et al. |
| 6,332,163 B1 | 12/2001 | Bowman-Amuah |
| 6,336,996 B1 | 1/2002 | Steiner |
| 6,341,312 B1 | 1/2002 | French et al. |
| 6,347,374 B1 | 2/2002 | Drake et al. |
| 6,347,376 B1 | 2/2002 | Attwood et al. |
| 6,356,941 B1 | 3/2002 | Cohen |
| 6,366,952 B2 | 4/2002 | Pitts |
| 6,393,568 B1 | 5/2002 | Ranger et al. |
| 6,442,748 B1 | 8/2002 | Bowman-Amuah |
| 6,460,046 B1 | 10/2002 | Meek |
| 6,480,861 B1 | 11/2002 | Kanevsky et al. |
| 6,496,850 B1 | 12/2002 | Bowman-Amuah |
| 6,505,241 B2 | 1/2003 | Pitts |
| 6,529,909 B1 | 3/2003 | Bowman-Amuah |
| 6,529,948 B1 | 3/2003 | Bowman-Amuah |
| 6,532,465 B2 | 3/2003 | Hartley et al. |
| 6,539,396 B1 | 3/2003 | Bowman-Amuah |
| 6,550,057 B1 | 4/2003 | Bowman-Amuah |
| 6,578,068 B1 | 6/2003 | Bowman-Amuah |
| 6,581,052 B1 | 6/2003 | Slutz |
| 6,601,192 B1 | 7/2003 | Bowman-Amuah |
| 6,606,660 B1 | 8/2003 | Bowman-Amuah |
| 6,609,123 B1 | 8/2003 | Cazemier et al. |
| 6,615,253 B1 | 9/2003 | Bowman-Amuah |
| 6,633,936 B1 | 10/2003 | Keller et al. |
| 6,636,585 B2 | 10/2003 | Salzberg et al. |
| 6,658,091 B1 | 12/2003 | Naidoo et al. |
| 6,658,625 B1 | 12/2003 | Allen |
| 6,678,355 B2 | 1/2004 | Eringis et al. |
| 6,681,331 B1 | 1/2004 | Munson et al. |
| 6,687,702 B2 | 2/2004 | Vaitheeswaran et al. |
| 6,694,368 B1 | 2/2004 | An et al. |
| 6,714,778 B2 | 3/2004 | Nykanen et al. |
| 6,789,046 B1 | 9/2004 | Murstein et al. |
| 6,807,546 B2 | 10/2004 | Young-Lai |
| 6,820,082 B1 | 11/2004 | Cook et al. |
| 6,842,105 B1 | 1/2005 | Henderson et al. |
| 6,851,004 B2 | 2/2005 | Keller et al. |
| 6,941,369 B1 | 9/2005 | Krack et al. |
| 6,941,472 B2 | 9/2005 | Moriconi et al. |
| 7,038,611 B2 | 5/2006 | Gounalis |
| 7,043,541 B1 | 5/2006 | Bechtolsheim et al. |
| 7,080,077 B2 | 7/2006 | Ramamurthy et al. |
| 7,085,834 B2 | 8/2006 | Delany et al. |
| 7,089,322 B1 | 8/2006 | Stallmann |
| 7,111,059 B1 | 9/2006 | Garcea et al. |
| 7,171,413 B2 | 1/2007 | Puz et al. |
| 7,231,378 B2 | 6/2007 | Lawson et al. |
| 7,248,568 B1 | 7/2007 | Loc et al. |
| 7,308,388 B2 | 12/2007 | Beverina et al. |
| 7,337,105 B2 | 2/2008 | Sugimoto |
| 7,342,896 B2 | 3/2008 | Ayyagari |
| 7,426,512 B1 | 9/2008 | Ben-Natan |
| 7,437,362 B1 | 10/2008 | Ben-Natan |
| 7,506,371 B1 | 3/2009 | Ben-Natan |
| 7,567,819 B2 | 7/2009 | Alone et al. |
| 7,904,454 B2 | 3/2011 | Raab |
| 7,933,923 B2 | 4/2011 | Ben-Natan |
| 7,970,788 B2 | 6/2011 | Ben-Natan et al. |
| 2002/0007363 A1 | 1/2002 | Vaitzblit |
| 2002/0010800 A1 | 1/2002 | Riley et al. |
| 2002/0019944 A1 | 2/2002 | Kou |
| 2002/0027907 A1 | 3/2002 | Tateoka |
| 2002/0059451 A1 | 5/2002 | Haviv |
| 2002/0066033 A1 | 5/2002 | Dobbins et al. |
| 2002/0066038 A1 | 5/2002 | Mattsson et al. |
| 2002/0078384 A1 | 6/2002 | Hippelainen |
| 2002/0095496 A1 | 7/2002 | Antes et al. |
| 2002/0095603 A1 | 7/2002 | Godwin et al. |
| 2002/0104017 A1 | 8/2002 | Stefan |
| 2002/0129140 A1 | 9/2002 | Peled et al. |
| 2002/0129271 A1 | 9/2002 | Stanaway et al. |
| 2002/0133723 A1 | 9/2002 | Tait |
| 2002/0147726 A1 | 10/2002 | Yehia et al. |
| 2002/0147927 A1 | 10/2002 | Tait |
| 2002/0152399 A1 | 10/2002 | Smith |
| 2002/0154646 A1 | 10/2002 | Dubois et al. |
| 2002/0157020 A1 | 10/2002 | Royer |
| 2002/0177910 A1 | 11/2002 | Quarterman et al. |
| 2003/0028624 A1 | 2/2003 | Hasan et al. |
| 2003/0046302 A1 | 3/2003 | Miron |
| 2003/0056200 A1* | 3/2003 | Li et al. ............... 717/128 |
| 2003/0084320 A1 | 5/2003 | Tarquini et al. |
| 2003/0084328 A1 | 5/2003 | Tarquini et al. |
| 2003/0182580 A1 | 9/2003 | Lee |
| 2003/0217069 A1 | 11/2003 | Fagin et al. |
| 2003/0217149 A1* | 11/2003 | Crichton et al. ............ 709/225 |
| 2004/0024764 A1 | 2/2004 | Hsu et al. |
| 2004/0093506 A1 | 5/2004 | Grawrock et al. |
| 2004/0098415 A1 | 5/2004 | Bone et al. |
| 2004/0111344 A1 | 6/2004 | Fetter et al. |
| 2004/0111623 A1 | 6/2004 | Miller et al. |
| 2004/0117037 A1 | 6/2004 | Hinshaw et al. |
| 2004/0143733 A1 | 7/2004 | Ophir et al. |
| 2004/0255301 A1 | 12/2004 | Turski et al. |
| 2004/0260947 A1 | 12/2004 | Brady et al. |
| 2005/0005031 A1 | 1/2005 | Gordy et al. |
| 2005/0071650 A1 | 3/2005 | Jo et al. |
| 2005/0086529 A1 | 4/2005 | Buchsbaum |
| 2005/0097149 A1 | 5/2005 | Vaitzblit et al. |
| 2005/0149537 A1 | 7/2005 | Balin et al. |
| 2005/0203921 A1* | 9/2005 | Newman et al. ............ 707/100 |
| 2006/0059154 A1 | 3/2006 | Raab |
| 2006/0143707 A1* | 6/2006 | Song et al. ............ 726/22 |
| 2006/0242431 A1 | 10/2006 | LeCrone et al. |
| 2007/0107052 A1* | 5/2007 | Cangini et al. ............ 726/22 |
| 2007/0112864 A1 | 5/2007 | Ben-Natan |
| 2007/0118534 A1* | 5/2007 | Hayes et al. ............ 707/10 |
| 2007/0180275 A1 | 8/2007 | Metzger et al. |
| 2008/0011843 A1 | 1/2008 | Barenburg et al. |
| 2008/0033960 A1 | 2/2008 | Banks et al. |
| 2008/0275843 A1 | 11/2008 | Lai et al. |
| 2009/0271453 A1 | 10/2009 | Ben-Natan |
| 2010/0131512 A1 | 5/2010 | Ben-Natan et al. |
| 2010/0131758 A1 | 5/2010 | Ben-Natan |

FOREIGN PATENT DOCUMENTS

| | | |
|---|---|---|
| WO | 98/31124 A1 | 7/1998 |
| WO | 99/66384 A2 | 12/1999 |

OTHER PUBLICATIONS

Newman, Aaron, Security Auditing in Microsoft SQL Server (Nov. 3, 2005) [retrieved from http://web.archive.org/web/20051227161250/www.appsecinc.com/presentations/Security_Auditing_MSSQL.pdf on Apr. 6, 2010].*

Application Security, Inc. AppRadar User Guide (Nov. 3, 2005) [retrieved from http://web.archive.org/web/20050204172218/http://www.appsecinc.com/techdocs/AppDetectiveUG.pdf on Apr. 5, 2010].*

Guardium Press Release, "Guardium Introduces SQL Guard" (Feb. 9, 2004) [retrieved from http://www.guardium.com/index.php/prprint/390 on Mar. 19, 2010].*

Webster's II New College Dictionary. Houghton Mifflin Co. (1995). p. 231.*

Deri, L; Carbone, R.; Suin, S. Monitoring Networks Using Ntop (2001) [Retrieved from http://citeseer.ist.psu.edu/old/414959.html on Apr. 7, 2010].*

Roesch, Martin. SNORT—Lightweight Intrusion Detection for Networks. Proceedings of LISA '99 13th Systems Administration Conference (Nov. 7-12, 1999) pp. 229-238 [retrieved from http://www.unenix.org on Apr. 6, 2010].*

Silberzchatz, A.; Korth, H.; Sudarshan, S. Database System Concepts. 5th Edition. McGraw-Hill Publishing ( May 17, 2005) pp. 934-936, 1078-1079.*

Guardiam, Inc. Auditing, Compliance, and Privacy Through Effective Controls on Data Access and Usage (Mar. 22, 2005). [retrieved from http://www.guardium.com on Apr. 6, 2010].*

Oyama, Y.; Onoue, K.; Yonezawa, A., "Speculative Security Checks in Sandboxing Systems," (Apr. 2005), Proceedings of the 2005 International Parallel and Distributed Processing Symposium (IPDPS) [retrieved from http://citeseerx.ist.psu.edu/viewdoc/summary?doi=10.1.1.79.1315&rank=1 on Apr. 7, 2011].*

Mukhar, K.; Lauinger, T.; Carnell, J., Beginning Java Databases, (2001), Wrox Press Ltd., pp. 262-264.*

Gray, J.S., Interprocess Communications in Linux, (2003), Pearson Hall PTR, pp. 451-453.*

Lunt et al., "IDES: A Progress Report," IEEE, 1990.

Jones Katherine, "Secure Internet Access to SAP's R/3: Keeping Dragons Out," Int. J. Network Mgmt., vol. 8 © 1998, pp. 191-199.

Joshi, James B. D., et al., "Security Models for Web-Based Applications," Communications of the ACM, vol. 44, No. 2, Feb. 2001, pp. 38-44.

Muller, Nathan J., "Improving Network Operations With Intelligent Agents," Int. J. Network Mgmt., vol. 7, © 1997, pp. 116-126.

Jaeger, T., et al., "Flexible Access Control Using IPC Redirection," Proc. of the 7th Workshop on Hot Topics in Operating Systems, Mar. 29-30, 1999, pp. 191-196.

Roscheisen, Martin, et al., "A Communication Agreement Framework for Access/Action Control," 1996 IEEE Symposium on Security and Privacy, © 1996, pp. 154-163.

Appenzeller, Guido, et al., "User-Friendly Access Control for Public Network Ports," IEEE 0-7803-5417-6/99, ©1999, pp. 699-707.

Balasubramaniyan, Jai Sundar, et al., "An Architecture for Intrusion Detection Using Autonomous Agents," 14th Annual Computer Security Applications Conf. Proc., Phoenix, AZ, Dec. 7-11, 1998, pp. 13-24.

Gangadharan, Muralidaran, et al., "Intranet Security with Micro-Firewalls and Mobile Agents for Proactive Intrusion Response," IEEE Int'l Conf. on Computer Networks and Mobile Computing, Beijing, China, Oct. 16-19, 2001, pp. 325-332.

Miller, Sandra Kay, "The Trusted OS Makes a Comeback," Computer, vol. 34, Issue 2, Feb. 2001, pp. 16-19.

Microsoft Computer Dictionary, 5th Edition, Microsoft Press, Redmond WA, © 2002, p. 22.

Chari, Suresh N., et al., "BlueBoX: A Policy-Driven, Host-Based Intrusion Detection System," ACM Transactions on Information and System Security, vol. 6, No. 2, May 2003, pp. 173-200.

Schepers, Filip, et al., "Network-Versus Host-Based Intrusion Detection," Information Security Technical Report, vol. 3, Issue 4, © 1998, pp. 32-42.

Levine, John, et al., "The Use of Honeynets to Detect Exploited Systems Across Large Enterprise Networks," Proc. of the 2003 IEEE Workshop on Information Assurance, West Point, NY, Jun. 18-20, 2003, pp. 92-99.

Kewley, Dorene L., et al., "DARPA Information Assurance Program Dynamic Defense Experiment Summary," IEEE Transactions on Systems, Man and Cybernetics—Part A: Systems and Humans, vol. 31, No. 4, Jul. 2001, pp. 331-336.

Dar et al., "dbSwitchtm: towards a database utility," Proceedings of the 2004 ACM SIGMOD international conference on Management of data, Jun. 2004 p. 892-896. Retrived from the Internet <URL:http//portal.acm.org/ft_gateway.cfm?id=1005726&type=pdf&coll=ACM&CFID=59243114&CFTOKEN=20435778>.

Feamster et al., "A model of BGP routing for network engineering," Proceedings of the joint international conference on Meaurement and Modeling of computer systems, Jun. 2004, p. 331-342. Retrieved from the internet:URL: http://portal.acm.org/ft_gateway.cfm?id=1005726&type=pdf&coll=ACM&dl=ACM&CFID=59243114&CFTOKEN=20435778>.

SQL Guard Version 4.0.2 User Guide, Aug. 18, 2005.

SQL Guard Version 4.0.2 Administrator Guide, Aug. 18, 2005.

User Guide for SQL Guard Version 5.1, Jul. 14, 2006.

Administrator Guide for SQL Guard Version 5.1, Jul. 21, 2006.

Rao et al., "A New Neural Network Architecture for Efficient Close Proximity Match of Large Databases", Database and Expert Systems Applications, 1997, Proceedings Eighth International Workshop Toulouse, France, Sep. 1-2, 1997, IEEE Comput. Soc. Sep. 1, 1997, pp. 444-449.

* cited by examiner

IDENTIFYING ATTRIBUTE PROPAGATION FOR MULTI-TIER PROCESSING

BACKGROUND

Modern information processing environments are experiencing a trend from the traditional client-server model to an application-server model. While the client-server model categorizes information resources as services to a client, an application-based architecture allows each application to perform specific and/or specialized portions of processing before handing a transaction or data stream off to a successive processing tier. An application-server model may exhibit a so-called multi tier arrangement or architecture. In a multi-tier arrangement, each tier is responsible for performing a particular aspect of processing. Tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

Each tier may perform particular functions, such as database queries, XML parsing, tunneling, protocol mapping, network transport, or GUI (graphical user interface) operations, for example. At each tier, attributes of the transaction or data stream are communicated to the next tier. However, certain attributes may be suppressed or omitted if those attributes are deemed unnecessary at the successive tier. Therefore, in a multi-tier arrangement, while scaling, information scope, and function consolidation may be improved, certain attributes of the transaction or information stream may not be propagated as readily as in conventional client server arrangements. Operations or functions that expect certain attributes available at a particular layer may encounter difficulty (i.e. unavailability) relying on that attribute.

SUMMARY

Multi-tier architectures and systems have gained popularity. In a multi-tier arrangement, functionality is arranged in to isolate or delegate processing details. Such a tier may be implemented in a layered approach, where processed data passes through layers of functionality, or a system approach where different nodes perform particular processing. However, in such a multi-tier framework, certain details or attributes may be genericized or suppressed at each layer. In other words, the different tiers may not necessarily pass on all attributes of a particular transaction, but rather only those deemed necessary for successive tiers. From a security perspective, such as for access control or audit trail functions, this tiered approach tends to obscure salient attributes. Often, security operations analyze attributes of a particular transaction, such as user, originator, destination, etc. Masking or omitting attributes as a transaction passes from tier to tier presents obstacles to such security related tracking that depends on the propagated attributes.

Modern information processing environments are experiencing a trend toward application-server (app-server) architectures. The application-server trend, however, presents challenges for security, audit, and tracking operations. Conventional information system monitoring attempts to tie a user (i.e. human operator) to a particular set of operations or functions. A monitoring process associates illicit or suspect activities to the responsible user. Attribute propagation in a tiered environment may mask attributes indicative of the responsible user. This additional level of indirection may obscure the responsible actor in a particular scenario because of unavailability of an attribute identifying the particular user.

Accordingly, processing that relies on the attributes rests on the assumption that the appropriate attributes are propagated from tier to tier. However, applications developed for a particular tier needs to ensure that the corresponding attributes are communicated from previous tiers. Often, however, applications are developed for integration with other applications from other vendors in a third-party manner. In such a scenario, source code may be unavailable, leaving a third party developer with integration with an application in an "as is" state. If an application interfaces or communicates with a fixed tier interface, the application only has the propagated attributes available. As the communications from tier to tier become more attenuated, attribute propagation becomes more selective.

Such an application-server trend, therefore, may present anomalies for conventional architectures relying on attributes that are not propagated from other tiers. In certain contexts, selective attribute propagation presents challenges for security and tracking operations, particularly for security measures designed to covertly or passively monitor a system using available attributes. Conventional information system monitoring (tracking) attempts to tie a user (i.e. human operator) to a particular set of operations or functions. A monitoring process ties illicit or suspect activities to the responsible user. For example, a DBMS (database management system) may allocate database connections from a pool of available connections. User sessions at the application tier request a connection from the pool, perform some operations and release it back to the pool. All users, over time share the same pool. The user credentials are not passed through to the database—and all database connections in the pool are supposedly logged in using a generic set of credentials—that does not allow identifying the real user responsible for the database operations. Such demand based allocation of accounts or addresses to the next available need tends to mask the identity of the responsible individual. This additional level of indirection may obscure the responsible actor in a particular scenario because of difficulties in determining the employee or colleague using a particular resource (i.e. account or address) at a particular time or for a particular purpose.

Therefore, a multi-tier approach presents issues with attribute propagation among the tiers. Applications designed to integrate with a particular tier need to ensure that the relevant attributes are propagated from tier to tier. Typical tier integration may appear as follows:

Tier 1→Tier 2→Tier 3

In such an arrangement, there is a communication between tier 1 and tier 2. There is communication between tier 2 and tier 3 that is typically triggered by something running in tier 2 that is serving the communication (request) that just came from tier 1. However, there may be no direct communication between tier 1 and tier 3. If tier 1 has attributes to be employed by the operations made on tier 3, conventional processing, such as in a client-server model, encounters difficulties because there is no direct communication or passing of the attributes on the communication to tier 3. As indicated above, in a typical $3^{rd}$ part scenario, source code access to tier 2 is unavailable for modification to propagate the required attributes. The database monitor discussed further below is shown as an example. The disclosed attribute propagation mechanism is applicable to other scenarios employing an attribute propagation mechanism for capturing attributes at a particular tier and tracking or propagating the attributes to a successive tier which may not have direct access.

In a particular context, the attributes may be employed for audit trail and access control purposes. Transactions are identified or tracked by the attributes propagated through the tiers along with the transaction. Reliance on attribute propagation, therefore, raises the issue of identifying attributes that are propagated through the tiers invoked while processing a particular transaction. Conventional database security applications, for example, attempt to track or associate database activity performed by a particular user. One mechanism often employed by conventional security measures includes tracking attributes, such as a username, to database access attempts. Typically, a conventional database access is performed via a particular account accessible to a known user (i.e. user login). Subsequent operations reflect the username or other identifier of the account. Database access monitoring is facilitated because the account is specific to a particular user. A tiered approach may tend to mask the user associated with a particular database access attempt, such as through a database connection pool discussed above. While conventional database access employs a user login and carries a username attribute across successive transactions, a tiered approach may not propagate a user identifying attribute.

Configurations herein substantially overcome the problem of attribute propagation by matching (identifying) the tier to tier transaction operations using visible (available) parameters in terms of OS construct usage. Often, a series of related operations, such as those pertaining to a user session, are assigned to a particular processing unit. In a Linux, Unix or Windows® environment, a thread is often assigned to handle a series of operations (i.e. session) for a particular purpose. Operations performed by different tiers are identified by the thread performing the operation. Since the thread is an available OS parameter, and since the same thread performs the operations within the tier and accesses multiple communications channels that span multiple tiers, the propagation through one tier can be based on the thread identifier—i.e. the operations specified on the incoming communication can be matched with the operations specified on the outgoing communications based on the fact that the same thread handles the incoming and the outgoing communications. Therefore, attributes available on a particular tier may be captured and employed on successive tiers by keying off the thread performing the operations within the tier.

In an example arrangement, discussed further below, attribute propagation is employed in a database monitor arrangement. The database monitor is operable to track and report database access requests for security and audit trail purposes. Typically, such reports identify an operator by user credentials or identifiers trackable to a particular employee or operator. An example configuration includes the SQLGuard application, marketed commercially by Guardium, Inc. of Waltham, Mass. The user is identified by attributes such as user credentials that identify the responsible user. However, in a typical application-server architecture, a user may be managed by the application tier that uses a connection pool of database connections to access data from within the application tier. Configurations herein are based, in part, on the observation that assignment of pool managed resources, such as a set of connections (i.e. connection pool), may not carry the identity of the assigned user through successive database accesses. Accordingly, while the user credential attributes (i.e. password, security and other identity information) are usually validated upon initial login or entry into the system, the user identity may not propagate with successive transactions (i.e. database access attempts, or queries) from that particular user. Configurations herein provide the ability to identify the end user credentials and other client information (e.g. client ip) when using an application server architecture. In such a case the connection pool usually does not propagate the end-user credentials and the conventional audit trail may not be sufficiently informative. To resolve this, the communications with the database are identified because they are performed using OS system calls (e.g. write to a socket). The application request that carried the session information or the identity information is also identified as an OS system call (e.g. read from a socket). If the thread reading from the incoming socket is the same as the thread writing to the outgoing socket then the system knows that the user credentials can be assigned to the database requests—even though the application does not explicitly propagate this attribute through the application tier.

Therefore, conventional tiered arrangements suffer from the shortcoming that the user identifying attributes may not be propagated across tiers to enable usage by a database security application operable to identify the user or actor responsible for a particular database access attempt. In the specific example discussed below, pool managed resources such as database connections may not sufficiently identify the currently assigned user for tracking and access control purposes. Conventional database monitoring and management applications may encounter difficulties tracking responsible users through a pool, or set, of randomly or demand assigned connections. Accordingly, configurations herein substantially overcome the shortcomings disclosed above by providing a multi-tier attribute tracking mechanism that identifies database connections and requests at the interprocess communication (IPC) level, such as sockets, pipes, and shared memory. Configurations herein are further based, in part, on the observation that such IPC communications are typically assigned a particular processing unit, such as a process or thread, and continue with the assigned processing unit until the completion of the application request. Therefore, subsequent database calls to access the database are performed by the same thread that assumed responsibility for the allocated connection to the user from the connection pool.

The configurations discussed further below disclose a multi-tier attribute tracking mechanism to identify the processing unit, thread or other computing unit assigned by the operating system to service the incoming request from the user. A matching of user requests to threads allows successive thread activity to be mapped back to the initiating user. Conventional interception of database access attempts at the application level (so called "server taps," or staps) identified only the database application and associated database user used when the connection pool was first initiated as the responsible user. Therefore, by intercepting, or "tapping" the access request at the kernel, or operating system level (using so-called kernel taps, or "ktaps"), the mechanism identifies the user credentials (i.e. attributes) upon the assignment of the connection to the user. Further tapping of the kernel (OS) calls to access the database is identifiable by the processing unit, or thread, performing the database calls, and correlated with the incoming request to identify the user responsible for the database call.

The resulting tracking of DB activity via kernel, or system, calls (Ktaps) therefore performs attribute propagation (i.e. user credential or identity information) through tiers of the application. Such tiers may also span multiple CPUs, systems or platforms depending on the architecture. By seeking deterministic identity information, not statistically likely correlation based on pattern matching or similarity of activity comparisons, the determined user responsible for a database access attempt is assured to a greater extent than conventional methods.

In further detail, the specific example configurations disclosed below present a method of tracking database access through attribute propagation by receiving a request to access an application (application request), in which the request includes a user identifier indicative of a particular user making the request. The application then normally generates a session identifier which is re-sent for any user request to the application. The configuration disclosed below then monitors every incoming application requests, extracts the session identifier (or the user identifier if it is resent), and determines a processing unit associated with the request, such that the processing unit, typically a thread, is operable to service the request. A database (DB) monitor identifies a database call performed by the determined processing unit for satisfying the request via database access, and a matcher matches the database call to the request by identifying a processing unit (such as a thread) common to the application request and database call, the common processing unit identified by intercepting a system call to receive the request and a system call to send the database call. A managed table allows mapping of the common processing unit with the session identifier and then with the user identifier to identify the user responsible for the database access.

In the example arrangement, as discussed further below, the user credentials for matching the user may occur only on the first application request (such as a connection attempt). However, the operating system typically creates a session identifier applicable to successive application requests. The thread (or other processing unit) employs the session identifier for servicing successive application request in the session (i.e. on behalf of the same user). A mapping of user credentials to the session ID allows the request calls made by the thread to the OS (having the session identifier) may be matched with the initial application request bearing the user credentials. In this manner, the reliable session identifier is matched, or associated, to the user even if user credentials are not directly available for the successive application requests.

The example arrangement includes identifying incoming IPC mechanisms through which application requests emanate from a user, and identifying outgoing IPC mechanisms through which the application requests to the database are made. System call interceptions include identifying the IPC mechanism by identifying a port against which a socket read was executed.

The request may be an inbound request including either a connection request or a data request, such that the inbound request. In servicing these application requests, outbound database calls are made to an outbound IPC portal operative to access data in the database on behalf of the user corresponding to the user identifier.

In the exemplary configuration, identifying the database call further comprises: intercepting an invocation to a system routine for accessing the outbound IPC portal, and correlating the processing unit performing the outbound IPC portal access with the processing unit performing the inbound request to access the database. Similarly, receiving the request includes intercepting invocations to a system routine for instantiating the processing unit, such that the processing unit is operable to perform a read via the interface resource to which the request is directed, in which receiving further comprising scrutinizing requests for at least one of a connection request and a query request.

In particular configurations, intercepting the outbound IPC portal access further includes watching write operations to a port associated with the database, the port accessible via a socket responsive to the processing unit, and identifying a user identifier corresponding to the processing unit, in which the processing unit further defines a thread assigned by the operating system for servicing the inbound request.

For inbound requests, in the example arrangement, receiving the request further includes listening to a set of ports designated for available connections operable for application access, and intercepting a connection request to a socket bound to one of the ports in the set of ports issued on behalf of a user. The DB monitor employs a user-to-thread table to identify a thread instantiated as the processing unit for servicing the connection request, such that the thread is operable to service successive data access requests emanating from the same user, and intercepts successive data access requests by watching socket writes to ports associated with the database made by the instantiated thread. Following intercepting the inbound connection request and identifying corresponding outgoing application requests, the corresponding outgoing database calls are performed by the same thread as the inbound request.

The connection request may include a credential indicative of the user, further including retrieving user identification information from the credential, identifying a session token corresponding to the user identification, identifying successive data access requests corresponding to the session token, and mapping the identified successive data access requests to the user via the session token.

Therefore, in the exemplary arrangement discussed below, one significance of the system call tap is that in typical application server environments, a thread gets created to serve a client request and this same thread is also the one that acquires the database connection and makes the application requests. This premise, together with the ability to intercept system (kernel) communications using ktap (and primarily socket communications) means that we can associate attributes that belong to the incoming socket with attributes that belong to the outgoing socket through the thread which is common.

In the configurations below, there are two example configurations disclosed—a single application tier and multiple application tiers. As discussed above, single application tier means that (for example) a browser hits a combined Web and application server which makes requests on a database server. A multi-tier scenario is one where the tier making the database request is not necessarily the tier that gets the client request from the user. One example for a multi-tier architecture occurs when a Web server is put in a DMZ, communicates with an application server that is already within the internal network and the app server makes calls to the database. The multi-tier case is far more complex and therefore we will support more limited configurations for multi-tier.

While the example arrangement includes examples from an http (Web) environment, the basic design does not rely on this; the approach builds the solution in a way that will work with other environments (e.g. CORBA, RMI, etc.) If anything, the Web architecture adds the complexity that requests are stateless and session information needs to be remembered to associate the user name in future requests. For alternate arrangements else (e.g. client IP) one could argue that maintaining an association with just threads and endpoints is sufficient. Alternate configurations are applicable to asynchronous operations employing different processing units, or threads, to complete an assigned task. For example, if a client request is handled by the app tier by putting a data request on a JMS queue that is handled by worker threads, identity of the multiple assigned treads is to be determined to form the association. Such an approach, however, is not the most typical scenario.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Managed information environments, particularly those employing database server for database access and security, frequently attempt to manage resources such as on-demand allocation from a shared pool. Pool managed resources may not sufficiently identify the currently assigned user for tracking and access control purposes. Conventional database monitoring and management applications may encounter difficulties tracking responsible users through a pool, or set, of randomly or demand assigned connections. Accordingly, configurations herein substantially overcome the shortcomings disclosed above by providing an interprocess communication tracking mechanism that identifies database connections and requests at the interprocess communication (IPC) level, such as sockets, pipes, and shared memory. Configurations herein are further based, in part, on the observation that such IPC communications are typically assigned a particular processing unit, such as a process or thread, and continue with the assigned processing unit for all operations required in order to satisfy the user request. Therefore, subsequent database calls to access the database are performed by the same thread that assumed responsibility for the allocated connection to the user from the connection pool.

The configurations discussed further below identify the processing unit, thread or other computing unit assigned by the operating system to service the incoming request from the user. A matching of users to threads allows successive thread activity to be mapped back to the initiating user. Conventional interception of database access attempts at the application level (so called "server taps," or staps) identified only the database application and associated connection pool as the responsible user. Therefore, by intercepting, or "tapping" the access request at the kernel, or operating system level (using so-called kernel taps, or "ktaps", the mechanism identifies the user credentials and/or other propagated attributes upon the assignment of the connection to the user. Further tapping of the kernel (OS) calls to access the database is identifiable by the processing unit, or thread, performing the database calls, and matched or mapped with the incoming request to identify the user responsible for the database call.

Figure 1:
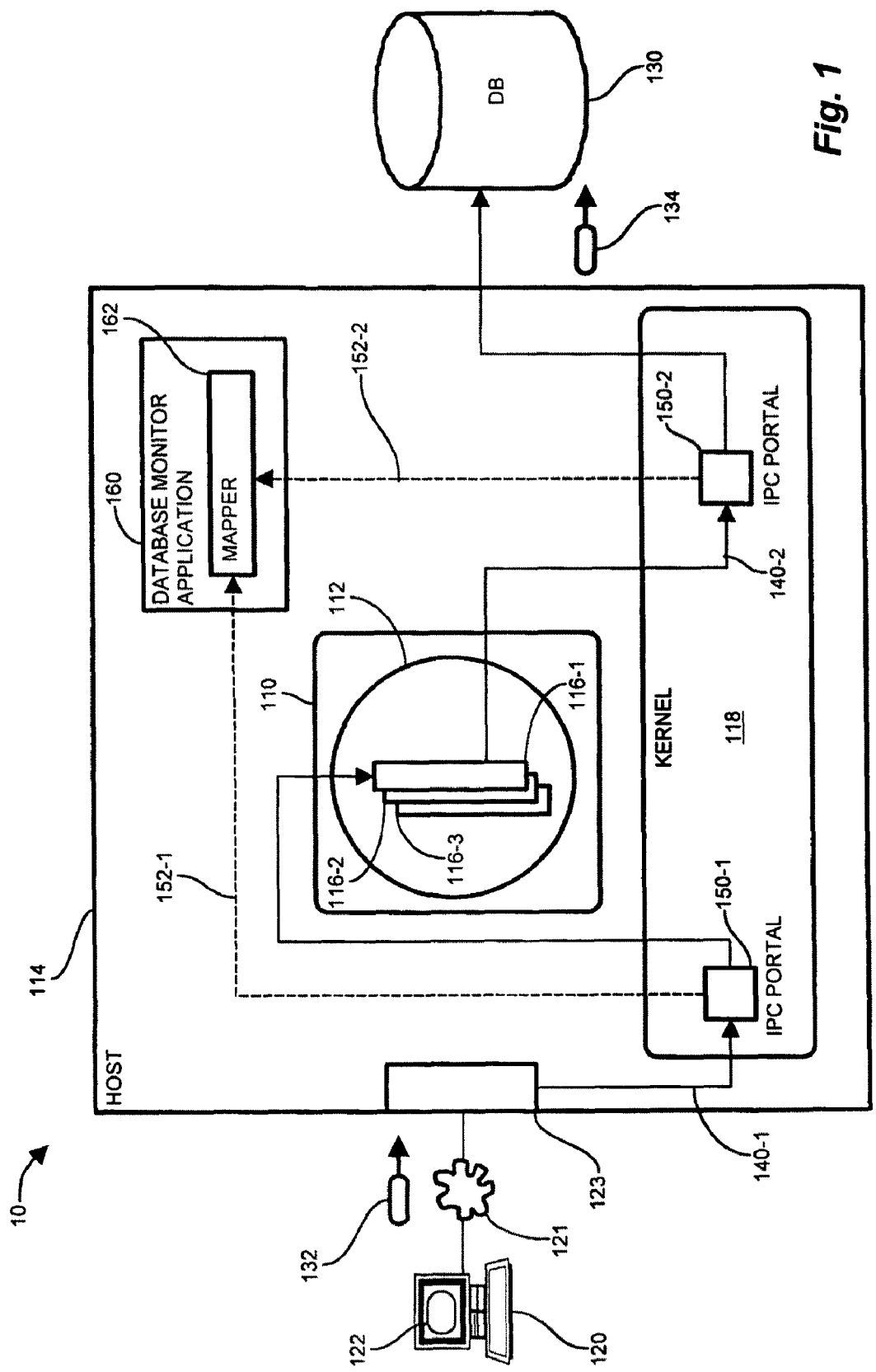
FIG. 1 is a context diagram of an exemplary managed information environment suitable for use with the present invention.

FIG. 1 is a context diagram of an exemplary managed information environment suitable for use with the present invention. Referring to FIG. 1, an application server 110 executes one or more processes 112 on a host 114. The host 114 also connects to a database 130 responsive to the application server 110. The application server (application) 110 interacts with a user console 120 via a graphical user interface (GUI) 122. The application 110 invokes the network interface 123 to interact with the user console 120 either remotely via the Internet 121, LAN, WAN or with a local I/O device (i.e. local monitor and keyboard), and receives application requests 132 for performing various database operations, such as connections, reads and writes. The application 110 is responsive to the application requests 132 by issuing database calls 134 to the database 130.

In the host 114, the application 110 may be one of many such applications 110-N executing on the host 114. Each application 110 typically further includes a plurality of processes 112. Therefore, the application requests 132 arrive via an interprocess communication (IPC) portal 150-1, 150-2 (150 generally) or mechanism for transporting data between processes 112. The example configuration shown depicts an inbound IPC portal 150-1 for receiving application requests 132, and an outbound IPC portal 150-2 for issuing database calls 134 to satisfy the application requests 132. Such an IPC portal 150 includes, for example, ports, sockets, shared memory, secure socket layer (SSL) pipes and others, as are known in the art. In a typical arrangement, the operating system, or kernel 118, manages the IPC portals. The application 110 makes or invokes a call to the kernel 118 for accessing the relevant IPC mechanism 150 such as the illustrated socket read and writes. Hence, the application requests 132 take the form of a system call 140-1 to a system routine for accessing the particular inbound IPC portal 150-1 employed for application requests 132. Similarly, the application 110 invokes a system call 140-2 to an outbound IPC portal 150-1 to perform the database call 134 for accessing the database (i.e. read, write, connect) for satisfying the application request 132.

Configurations discussed herein associate a user making an application request 132 with the database call 134 into the database to identify users responsible for a particular access. Each process 112 includes a plurality of processing units 116-1.116-3 (116 generally). The processing units 116 each include a corresponding independent instruction counter (i.e. program counter) indicative of the execution sequence of instructions, concurrently with other processing units. In an example arrangement, the processing units may be threads, as is known in the Unix or Windows® series of operating systems (OS). Configurations herein are based, in part, on the observation that the processing unit 116-1 receiving the system call 140-1 to service the incoming application request 132 from the IPC portal 150-1 is the same processing unit 116-1 assigned to perform the system call 140-2 to the IPC portal 150-2 to perform the database call 134. Accordingly, a database monitor application 160 intercepts both the system call 140-1 for the application request 132 (arrow 152-1), and the system call 140-2 for the database call 134 (arrow 152-2). A mapper 162 identifies the thread 116-1 performing the system calls 140-1, 140-2 and associates the user corresponding to the incoming application request 132 with the outgoing database call 134. Since the incoming request 132 includes information that identifies the user, such as user credentials, while the database call 134 is a generic system call 140-2, the correlator identifies the thread performing the database call 134 as the same one servicing the incoming application request 132 on behalf of a particular user. The method therefore identifies the user by tracking attribute propagation of the database transaction, in which the attributes are the user credentials and the assigned thread, in the example configuration. Alternative uses of attribute propagation may be employed.

Figure 2:
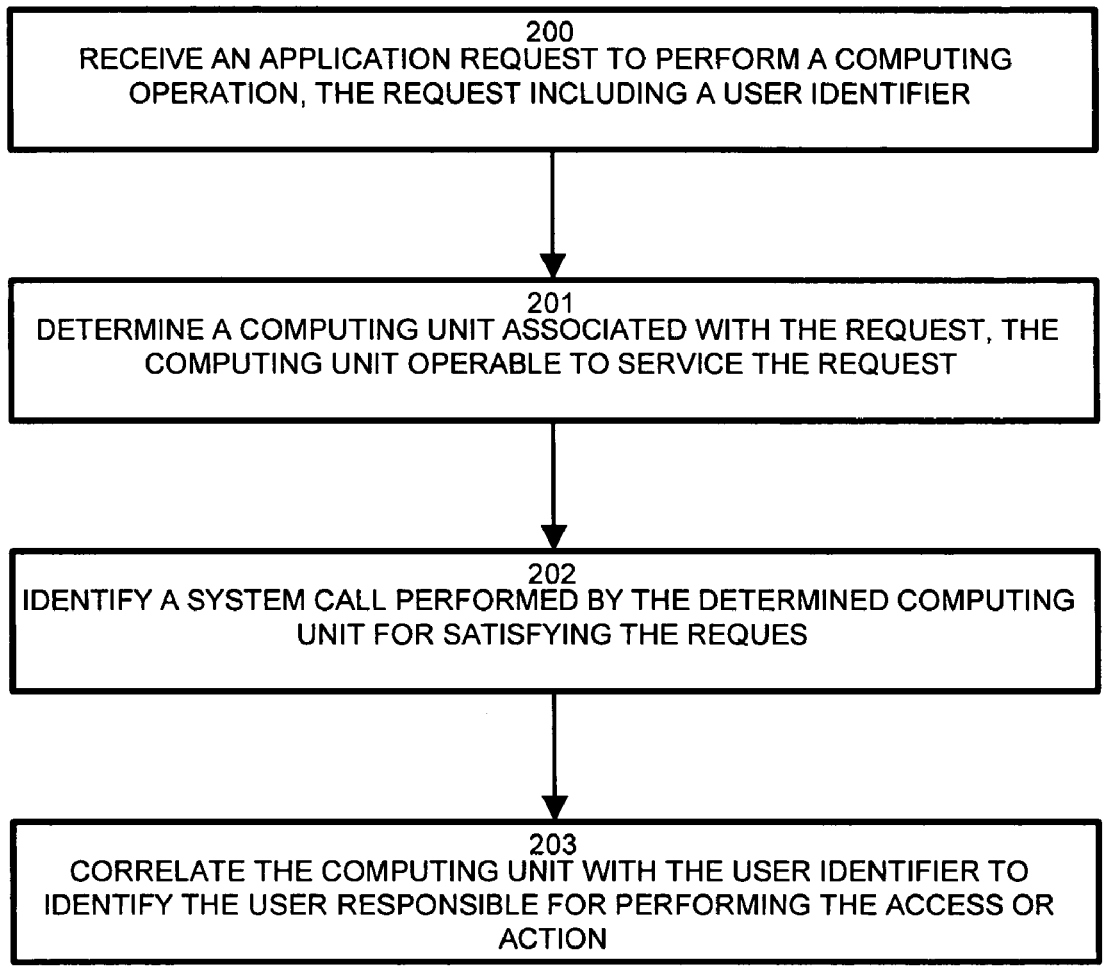
FIG. 2 is a flowchart of database access monitoring in the environment of FIG. 1; of FIG. 1.

FIG. 2 is a flowchart of database access monitoring in the environment of FIG. 1. Referring to FIGS. 1 and 2, the method of tracking database access by identifying attribute propagation as disclosed herein includes, at step 200, receiving an application request 132 to access a database 130, in which the request includes a user identifier or credential (163-4, FIG. 3). The database monitor application 160 determines a computing unit 116, such as a thread, associated with the request, such that the computing unit is operable to service the request, as depicted at step 201, and identifies a system call 134 performed by the determined computing unit 116 for satisfying the request 132 via database or other access, as disclosed at step 202. The mapper 162 matches the computing unit 116 with the user identifier 163-4 to identify the attribute corresponding to the database access 132 or other application function, as shown at step 203.

Figure 3:
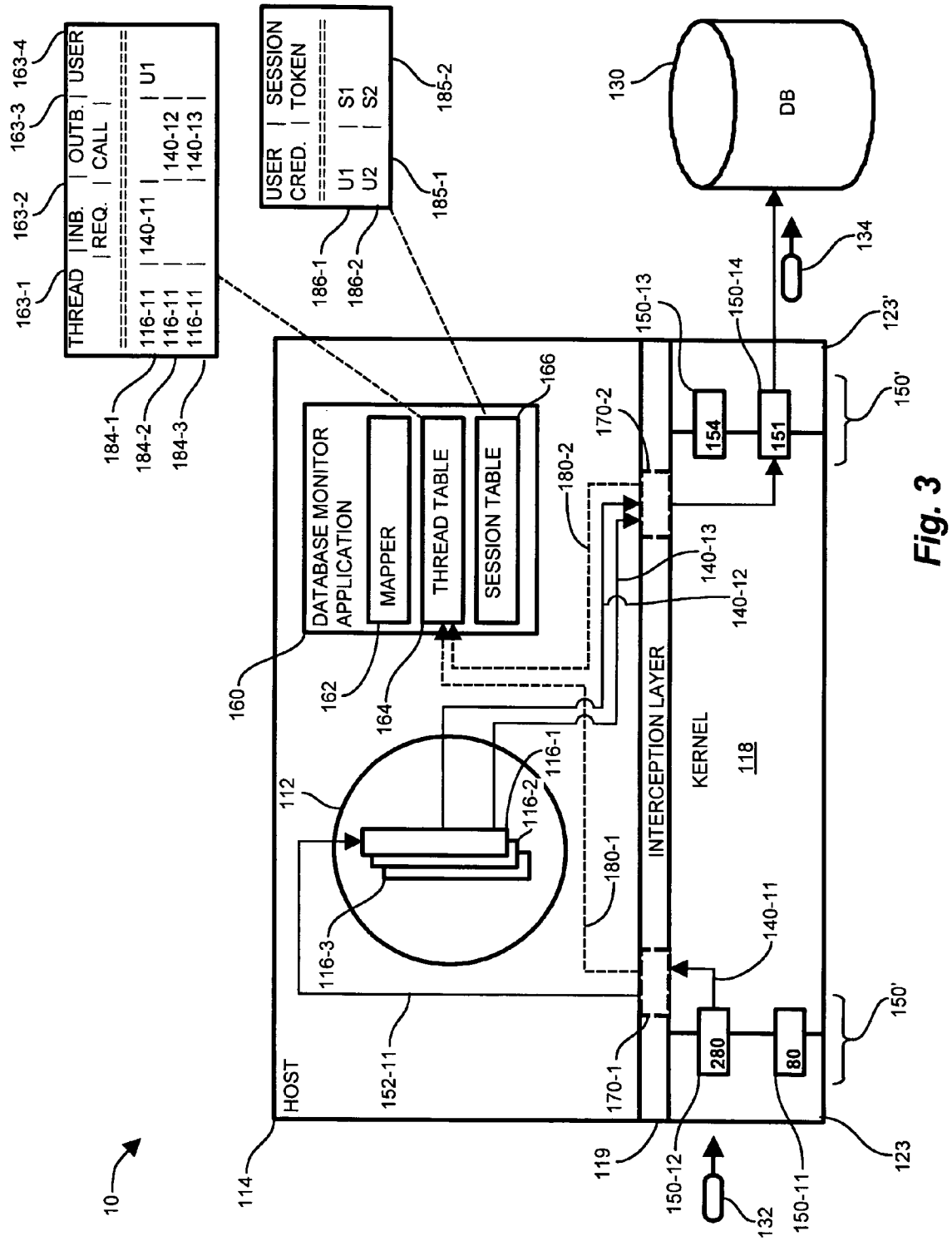
FIG. 3 is a block diagram of interception of application requests in the environment of FIG. 1.
Figure 4:
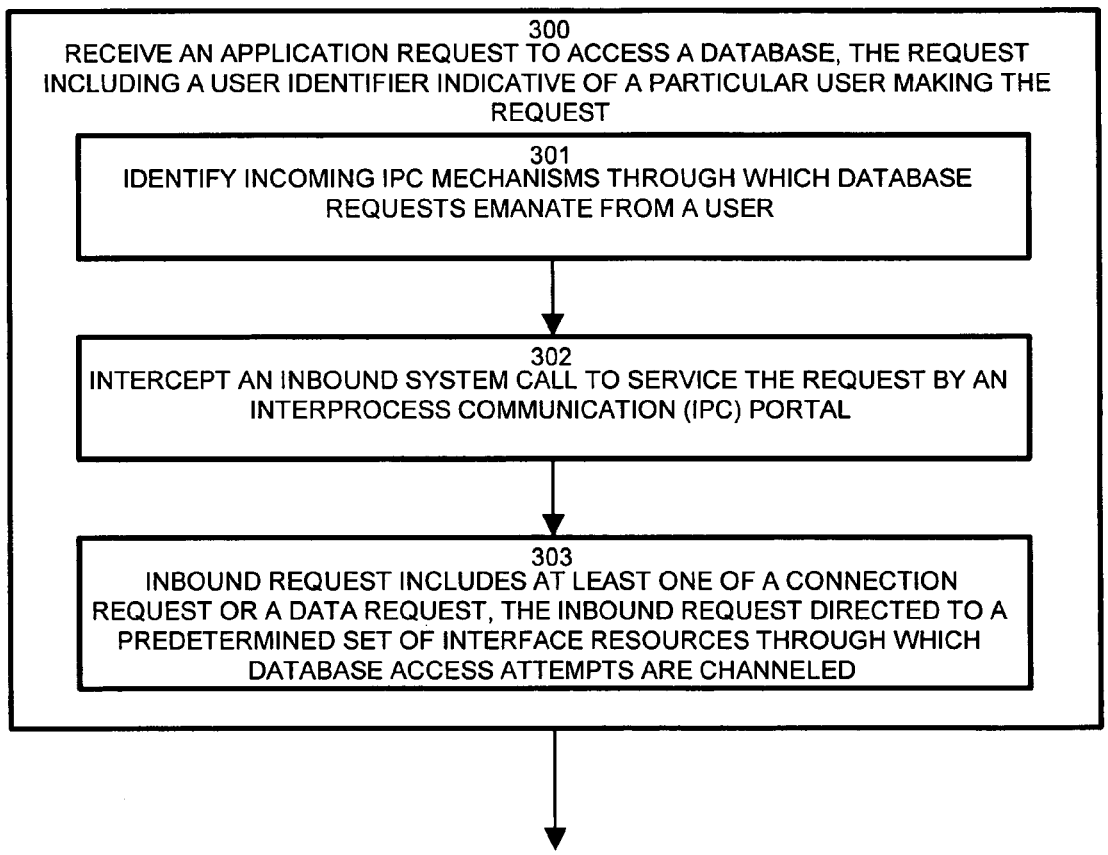
FIGS. 4-8 are a flowchart of interception via an IPC mechanism in the system of FIG. 3.
Figure 5:
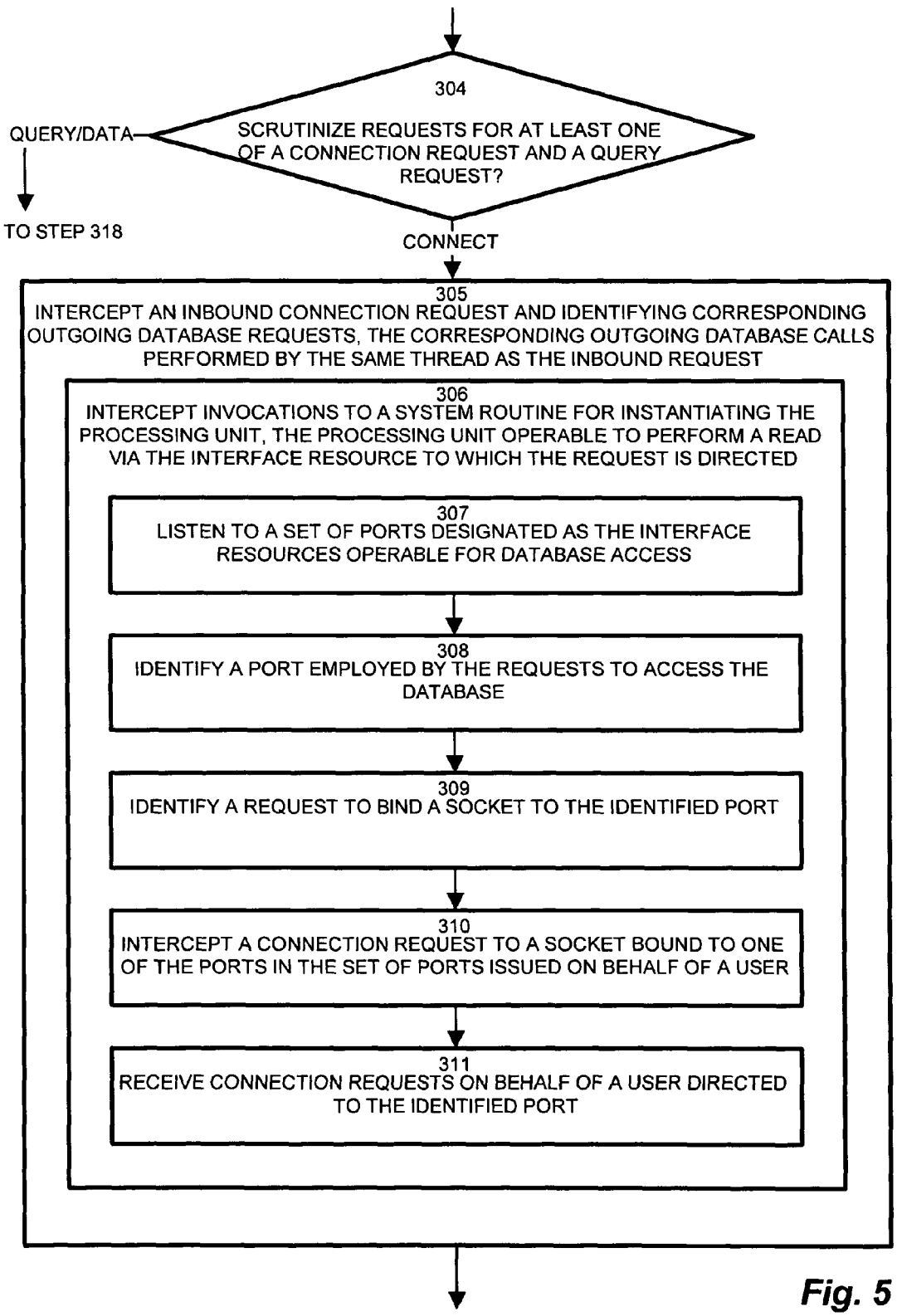
Figure 6:
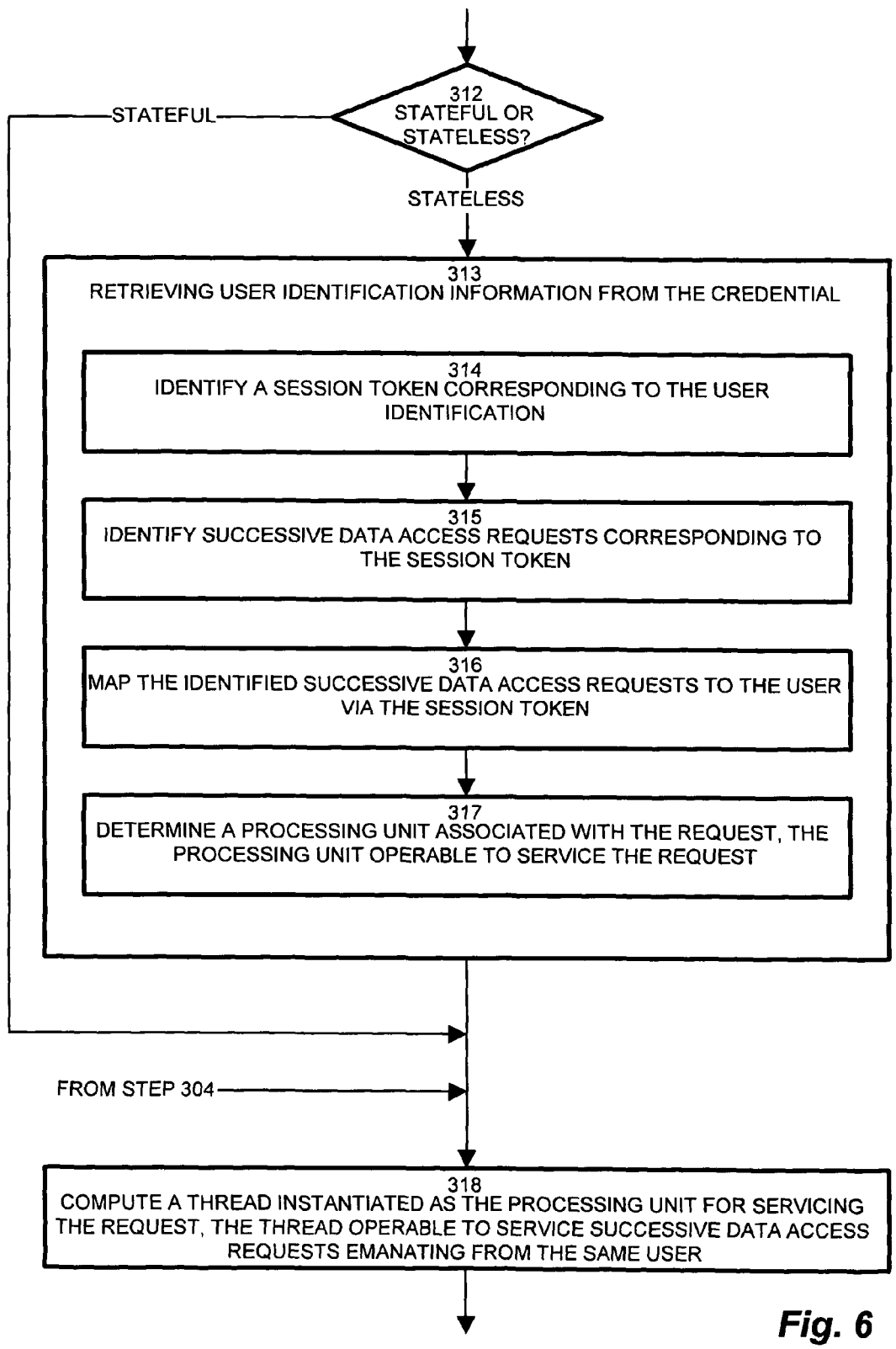
Figure 7:
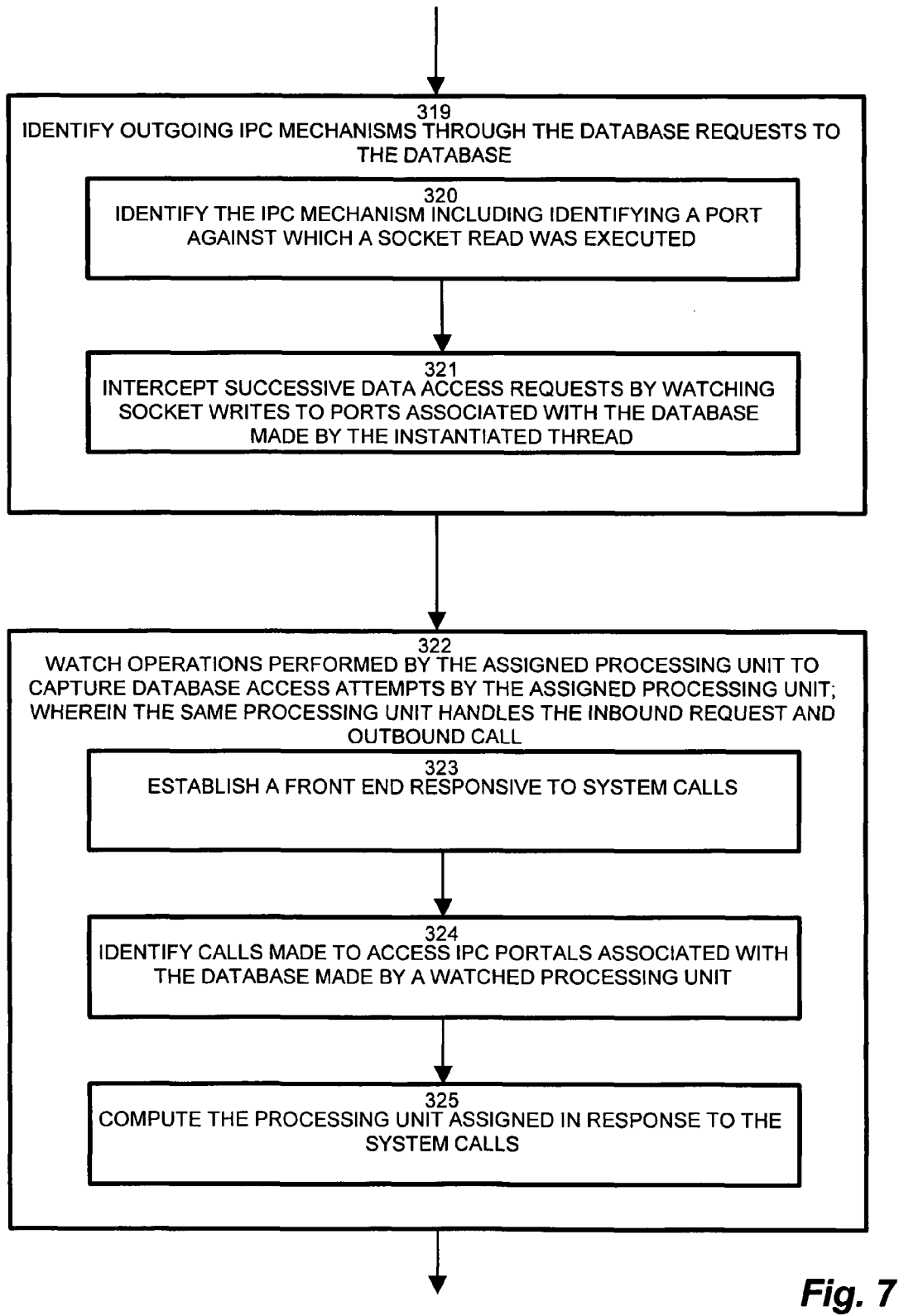
Figure 8:
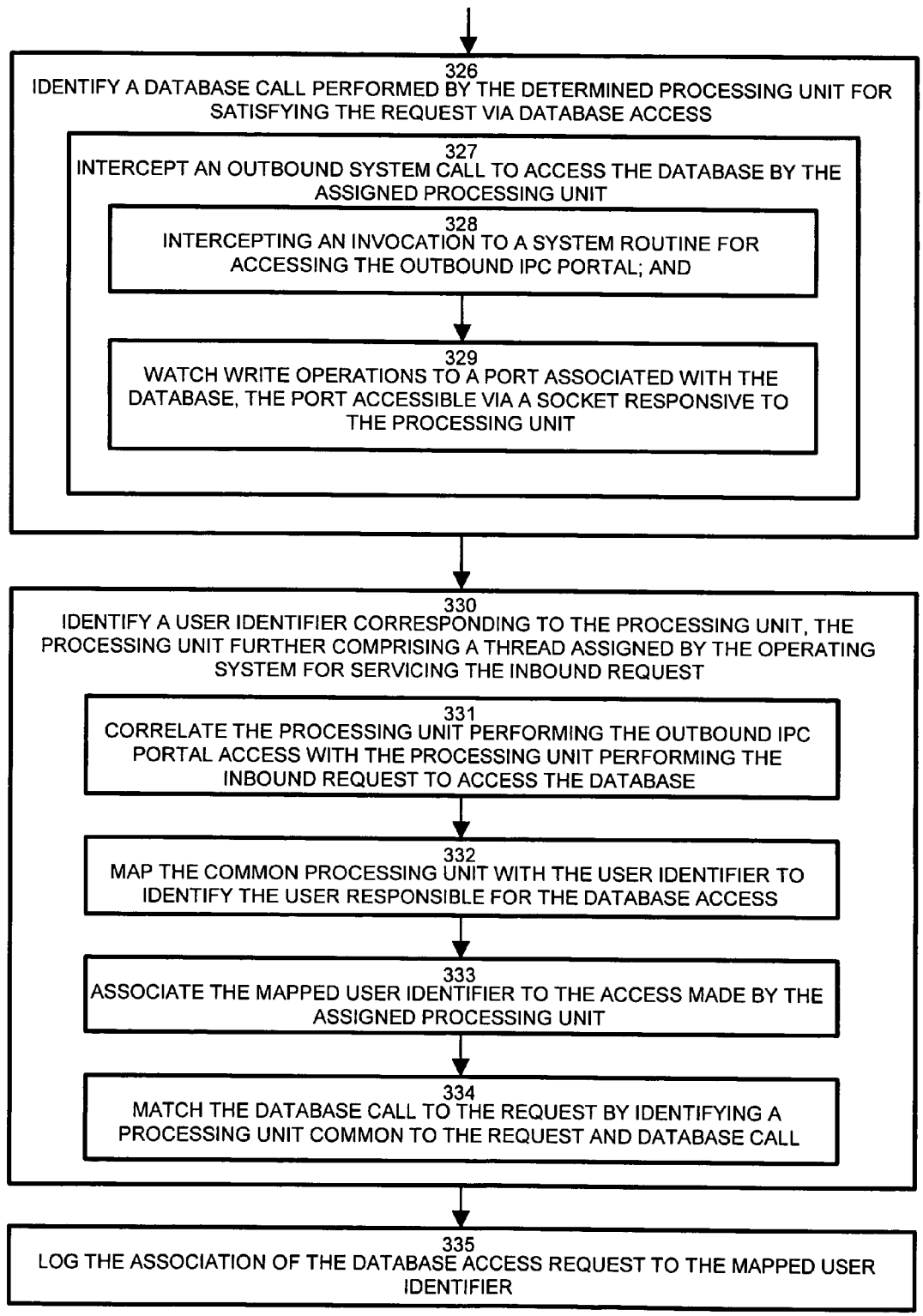

FIG. 3 is a block diagram of interception of application requests in the environment of FIG. 1. Referring to FIG. 3, an example configuration including ports and sockets as the IPC mechanism is shown. The IPC portal 150, or mechanisms, therefore, comprises ports 150' specific to both the application 110 and the database 130. The process 112 executes the threads 116 that receive an initial connection request 132 from a user and perform subsequent database calls 134 responsive to application requests 132. In such an environment, the process 112 creates sockets corresponding to a particular thread 116 and binds the sockets to the ports 150'. As is known in the art, the ports 150' are generally assigned particular purposes or contexts, for example, HTML (Web page) requests typically employ well-known port 80, while secure HTML (SHTML) transmission employ port 280. Other operations, such as the system calls 140 to the database, employ particular ports, and may or may not be specifically enumerated in the IETF well-known port list promulgated by the Internet Assigned Numbers Authority (IANA). System calls 140 as employed herein are identified, or intercepted, when a thread 116 performs socket reads and writes using the inbound 123 and outbound 123' interface via the kernel 118. Alternate configurations may employ other IPC mechanisms suitable for kernel 118 invocation, however the socket read/write via a port is employed in the discussion herein.

The ports 150' are managed by the operating system, or kernel 118 of the host 114. Incoming application requests 132 arrive incoming via the interface 123 directed to a particular port 150' for servicing by a thread 116. The thread 116 invokes a socket to bind to the particular port to be read. The ports 150', employed by the application 112 for reading (receiving) application requests 132, and the ports 150' employed by the database 130 for reading database calls 134, are preconfigured elements of the system environment 10. Therefore, an interception layer 119 watches each port 150 employed for application requests 132 (incoming) and database calls 134 (outgoing). Upon receipt of a application request 132, the database monitor 160 creates or references an entry 184 in the thread table 164. Upon interception of a database call 134, the database monitor 160 stores the entry 184 in the thread table 164 identifying the thread 116 invoking the database call 134. Typically, an initial application request 132 is a connect request, followed by subsequent data requests 132. Each application request 132 usually results in one or more database calls 134 to access the data in the database 130. The incoming application requests 132 identify the user and the thread 116-1, and the outgoing database calls 134 are made by the same thread 116-1, using system calls 140 for port 150' writes via the outbound interface 123, allowing the mapper 162 to reconcile the database calls 134 with the initiating user.

In the example shown, an initial system call 140-11 is serviced by thread 116-1, shown by arrow 152-11. The interception layer 119 intercepts the system call 140-11 at intercept point 170-1. The database monitor 160 receives the identity of the thread 116-1 and the identity of the user as U1, and stores a corresponding entry 184-1 in the thread table 164. Each entry stores the acting thread 163-1, the inbound 163-2 or outbound 163-3 call made, and a user identifier 163-4 for inbound calls (generally when the user identity information is available) The subsequent accesses from the same thread 116-1 are intercepted at interception point 170-2. It should be noted that the intercept points 170-1, 170-2 (170 generally) are any applicable intercept or interrupt signaled by the IPC mechanism in use. The database monitor 160 receives the intercepted system calls 140-12, 140-13, as shown by arrow 180-2, and stores corresponding entries 184-2, 184-3, identifying the responsible thread as 116-1. The mapper 162 performs matching of the database calls 134 resulting from system calls 140-12 and 140-13 by identifying matching thread values 116-1 in the thread table 164. The user identity U1 may be either a user identifier or a session identifier. In an asynchronous system, the user identity may not be available to the system call intercept 170-1, however a session token, or identifier, may also be employed. A session table 166 maps the user identity U1 to the session token S1 corresponding to the database calls 134 made by the thread 116. Resulting analysis and reporting of the intercepted and analyzed application requests 132 and calls 134 therefore identifies the user 185-1 associated with each such application request 132. The disclosed table mapping and matching using the thread table 164 and session table 166 is shown for illustrative purposes. Alternate mechanisms for associating the invoking thread and corresponding user credentials and actions may be implemented.

Therefore, the disclosed tier propagation mechanism identifies or intercepts transactions sought to be audited or tracked by intercepting system calls 140 to perform trigger the auditable activity. The thread 116 invoking the call is identified to determine the session initiating the thread 116. The user responsible for the thread is identified from the session identifier stored when the user initiated the session. As discussed above, the user credentials are expected on at least the first application request 132, and successive requests include at least the session identifier. Thus, traversing "backwards" through the thread, to the session, and to the user credentials may be performed by matching the respective identifiers. Typically, a table lookup, as discussed above, although any suitable lookup technique for mapping or correlating the entries 184, 186 in the tables 164, 166 may be employed. It is notable that, while the attributes directly indicative of the user may not be propagated across the tiers, the above described matching of threads and sessions by which system calls are invoked allows reconciliation of audited transactions from available attributes to fulfill audit trail and regulatory expectations.

FIGS. 4-8 are a flowchart of interception via an IPC mechanism in the system of FIG. 3. Referring to FIGS. 3-8, In FIG. 3 the IPC mechanism 150 (portal) is a socket bound to particular ports 150' employed by the application process 112 (150-11,12) and by the database (150-13,14). A thread 116 in the process 112 is assigned to service both the request 132 and to make the database call 134, according to the sequence enumerated below. At step 300, the host 114 receives an application request 132 to access a database 130, in which the request 132 includes a user identifier 163-4 indicative of a particular user making the request 132. This includes identifying incoming IPC portals 150-11, 150-12 or mechanisms through which application requests 132 emanate from a user via the user device 120, as depicted at step 301. Database access is shown as an example. The attribute propagation and identification mechanism disclosed may be employed with a variety of application requests 132 for application functions. The interception layer 119 intercepts an inbound system call 140-11 to service the request 132 by an interprocess communication (IPC) portal 150', as shown at step 302. As indicated above, the IPC portal 150 may be any suitable IPC mechanism, such as shared memory, pipes, SSL, or others, rather than the illustrative ports 150-11 . . . 150-14. Generally, the request 132 further comprises an inbound request that is either a connection request or a data request, such that the inbound request 132 is directed to a predetermined set of interface resources (i.e. 170-1, 170-2), such as connections from a connection pool, through which database access attempts are channeled, typically system calls, as disclosed at step 303. In the example shown, the ports 150-11 . . . 150-12 are known to receive the inbound request 132. In a typical exchange, a connect request identifying the user is followed by a series of data requests referencing the same user or session 163-4, and serviced by the same thread 116-1, now discussed in further detail below.

A check is therefore performed at step 304 to scrutinize the application requests 132 for at least one of a connection request and a query request. If the application request 132 is determined to be a connection request, then the host 114 intercepts the inbound connection request 132 for identifying corresponding outgoing database calls 134, such that the corresponding outgoing database calls 134 are performed by the same thread as the inbound request 132, as disclosed at step 305. Receiving the request 132 further includes intercepting invocations 140-11 to a system routine for instantiating the processing unit 116-1, in which the processing unit 116-1 is operable to perform a read 152-11 via the interface resource 150-12 to which the request 132 is directed, as shown at step 306.

In the example arrangement in FIG. 3, the interface resource 150-12 is a port, such as port 280 for reading HTPPS packets. In this arrangement, receiving the request 132 further includes listening to a set of ports (150-11, 150-12) designated as the interface resources operable for database access, as depicted at step 307, and identifying a port 150-12 employed by the application requests 132 to access the database 130 or perform other application functions or processing operations, as shown at step 308. The database monitor application 160 thus identifies the request to bind a socket to the identified port 280 (150-12), as depicted at step 309, and intercepts 170-1 the connection request 132 to a socket bound to one of the ports 150-12 in the set of ports issued on behalf of a user, as shown at step 310. The database monitor 160 therefore receives connection requests 132 on behalf of a user directed to the identified port 150-12, as shown by arrow 180-1 and disclosed at step 311, thus allowing the database monitor 160 to store the assigned thread 116-1 and the user information in the thread table 164 as fields 163-1 and 163-4, respectively as entry 184-1.

At step 312, a check is performed to identify stateful or stateless transactions. In the event of stateless transactions, a session token 185-2 or identifier accompanying each request 132 is mapped to user credentials 185-1 via the session table 166. Since stateless transactions may present difficulties identifying the user corresponding to each application request 132, the session token 185-2 is associated to a user credential 185-1 which is present on at least the initial connection request 132. Therefore, if a stateless environment exists, then the connection request 132 includes a credential 185-1 indicative of the user and the database monitor 160 retrieves user identification information from the credential 185-1, as depicted at step 313. The database monitor 160 identifies a session token 185-2 corresponding to the user identification, as depicted at step 314. The database monitor may then identify successive data access requests 132 corresponding to the session token 185-2, as shown at step 315, allowing mapping of the identified successive data access requests to the user via the session token, as shown at step 316. The database monitor 160 determines a processing unit (thread) 163-1 associated with the request 132, such that the stored processing unit 116-1 is operable to service the connection request 132, as depicted at step 317.

Continuing from step 304 in the event of a data request, or from step 317 in the event of a connection request, the database monitor computes the thread 163-1 instantiated as the processing unit 116 for servicing the request 132, such that the thread 116-1 is operable to service successive data access requests 132 emanating from the same user 163-4 as shown at step 318. Therefore, the initial connection request establishes a record 184-1 in the thread table 164 to track successive database calls by the same thread, and, in a stateless environment, also creates an entry 186 in the session table 166 to correlate the session with the user 163-4 from the thread table.

The thread 116 assigned to service the connection request 132 makes database calls 134 at a successive time on behalf of the connected user. Accordingly, the database monitor 160 identifies outgoing IPC portals 150-2 or mechanisms through the application requests 132 to the database 130 from the thread 116-1, as depicted at step 319. As the threads 116 perform database calls 140 to the IPC mechanism 150, the database monitor 160 captures, or intercepts, the calls 140 at the interception layer 119. In the example configuration shown, the database monitor 160 identifies the IPC mechanism including identifying a port 150-13, 150-14 for which a socket write or read was executed, as shown at step 320. The database monitor 160 continues intercepting successive data access requests 134 by watching socket writes 140-12, 140-

13 to ports 150-13, 150-14 associated with the database 130 which are made by the instantiated thread 116-1, depicted at step 321.

Having identified the applicable ports 150-13, 150-14 or other IPC portal 150 in use, the database monitor 160 watches operations performed by the assigned processing unit 116-1 to capture database access attempts 140 by the assigned processing unit 116-1, in which the same processing unit 116-1 handles the inbound request 132 and outbound call 134, thus tying the user associated with the request 132 to the database call 134, as disclosed at step 322. In the example configuration, watching the socket reads and writes to ports further includes establishing a front end responsive to system calls 140, as depicted at step 323. The interception layer 119 defines the front end for intercepting system calls 140 at the interception points 170. The interception layer 119 thus filters system calls 140 by identifying calls made to access IPC portals 150 associated with the database 130 made by a watched processing unit 116-1, as shown at step 324. Once intercepted, as shown by arrows 180, the database monitor 160 computes the processing unit 116 assigned in response to the system calls 140, as depicted at step 325.

The database monitor 160 identifies a database call 134 performed by the determined processing 116-1 unit for satisfying the application request 132 via database access, as shown at step 326. In the example shown, employing port writes as the IPC mechanism, this includes intercepting an outbound system call 140-12, 140-13 to access the database 130 by the assigned processing unit 116-1, as depicted at step 327. The database call is an outbound database call 140 to an outbound IPC portal 150-2 operative to access data in the database 130 on behalf of the user corresponding to the user identifier 163-4. Therefore, identifying the database call 134 further includes intercepting an invocation to a system routine 140 for accessing the outbound IPC portal 150, as disclosed at step 328. Intercepting the outbound IPC portal access is performed by watching write operations to a port 150-14 associated with the database 130, in which the port is accessible via a socket responsive to the processing unit 116, shown at step 329.

From the intercepted system call 140, the mapper 162 identifies a user identifier 163-4 corresponding to the processing unit 116-1, in which the processing unit 116 further defines a thread 116 assigned by the operating system (i.e. kernel 118) for servicing the inbound request 132, as depicted at step 330. Thus, the mapper 162 matches the processing unit 116-1 performing the outbound IPC portal 140-12, 140-13 access with the processing unit 116-1 performing (servicing) the inbound request 132 to access the database, disclosed at step 331. The mapper 162 maps the processing unit 116 to a user identifier 163-4 in the inbound system call 140-11, now stored in the thread table 164. Traversing the thread table 164, the mapper 162 maps the common processing unit 116-1 (thread) with the user identifier 163-4 to identify the user responsible for the database access request 132, as depicted at step 332. For each outbound system call 140-12, 140-13 made to the database, the mapper 162 associates the mapped user identifier 163-4 to the access 134 made by the assigned processing unit 116-1, as shown at step 333. The mapper 162 correlates the database call 140-12, 140-13 to the request 132 by identifying a processing unit 116-1 common to the request 132 and database call 140-12, 140-13, as depicted at step 334. As indicated above, in the example shown, the common processing unit 116-1 is identified by intercepting a system call 140-11 to receive the request and a system call 140-12, 140-13 to send the database call 134. Matching entries 184-1, 184-2 and 184-3 having the same thread 116-1 indicate operations of the same user. Having identified the user 163-4 corresponding to a database access request 134, the database monitor 160 logs or reports the association of the database access request 134 to the mapped user identifier 163-4, as shown at step 335, thus providing a report of each user initiating an application request, such as the example database access request 132.

In a particular example arrangement, a scenario such as the following evolves: a program that wishes to receive a connection from another program, asks the operating system to create a socket and bind it to some port. Then the program (i.e. application 110) sits and listens on the socket it has created to receive incoming connection. In the example configuration, a server tap (STAP) approach is employed to trap or intercept the socket based communication used by a thread to perform the connection/request reads and corresponding DB access calls. Both a single application tier and a multiple application tier may be implemented.

To support a single application tier environment, a particular stap is employed that we will install on the application server. We will not be inspecting the traffic from this node in any other way—only through this stap—i.e. we will exclude this traffic form network inspection and form stap on the database server.

To configure this stap, the DB monitor application 160 specifies the following items:

Which ports (or other means) the application server talks to the database. We need to be able to do all ktap interceptions that we support—no reason to limit the options here. Ktap will be intercepting this traffic even if it is a socket where the endpoint is on another machine. The decision on what to intercept is based on the identity of the application server, such as via a name.

Which ports serve as incoming ports—note that on the client-facing side the assumption is the we will only intercept socket endpoints.

What pattern we identify the username from and how to extract it. For example, if a Web form is used for user login then we will need to now to look for the appropriate strings in the request to know that this is a submit of the login form and which string to derive the user name from. Note that this may not be limited to just username/password type authentication. For example, if SSO tokens are used then we will trap the token and use that as the username—we will then employ external correlation in the DB monitor 160

For every incoming port (or range) a specification of whether this is a stateless or stateful server A stateless system employs a way to preserve sessions—therefore Web applications maintain a session identifier. For example, J2EE systems use a jsessionid attribute which they pass back and forth. We therefore need to know this key as a configuration parameter to allow us to associate requests that come in at a later time with the username.

Session timeout parameter

When the application server stap 170 starts up it will be doing two things. It will be intercepting all communications with the database using normal ktap behavior. It will send this information (through the stap) in a normal stap/ktap operational pattern—that part does not change.

Additionally, it will be intercepting all socket communications coming in based on the ports configured above. This too will be through ktap interception as opposed to stap because we need to associate thread ids with the incoming request. All data coming in through these reports will be inspected for two patterns—the login pattern and, if the port is defined to be stateless, the session identifier pattern 185-2. In any case the following table is maintained and populated (table 1: e.g. session table 166):
  Auto-generated ID1 (a unique identifier in this table)
  user name
  client ip
  client port
  session id (if stateless—otherwise it is empty)
For example, in the stateless case, the ktap looks for the login pattern. Every time it sees the login pattern it extracts the username 185-1 and starts inspecting the returned data looking for the session id pattern 185-2. Once it finds it, it fills in (or updates) the session table 166. In the stateless case filling in the table does not wait for the reply data—it can immediately be filled in after the login pattern has been received. When a socket is closed on the client side, the client ip and port are cleared but the username and session id remain. Typically a cleanup function clears entries based on time, similar to a typical application server. Whenever we update this entry (or get another request on it) we need to update a timestamp and a garbage collection process will remove entries based on the timeout. We will set the timeout to a value larger than the application server timeout to ensure that if we invalidate and entry the application server would have too.

In addition, when the client closes the socket and the client ip/port are cleared, the appropriate entry in table 2 (see below) is cleared—we need this to ensure we don't falsely attach an "owner" to application requests. Further, when such an event occurs (i.e. the user credentials are seen) an additional table (e.g. thread table 164) is populated as follows (table 2):
  ID1 (pointer to the user data)
  Thread ID of the thread for which the socket interception was done
  A flag that says whether or not this data was communicated already—starts with false
For stateless servers this table is also filled in when the session id pattern is received. i.e. for stateless servers the incoming requests are constantly being inspected for the session id pattern and when it is seen the session identifier is extracted. It is then used to look up the record in table 1 and table 2 is populated appropriately.

In addition to the clearing of table 2 when a socket is closed, we will clear the appropriate entry in case a thread dies. This way the table will never have garbage in it. If this is hard or we do not intercept these events we can just clear things on a garbage collection mechanism once in a while by checking whether the threads exist.

To complete the picture, whenever the ktap intercepts data that is going to the database 130 it uses the thread_id 163-1 to lookup within table 2. If the flag says true (i.e. data was already communicated) then we do not need to do anything. If the flag says false we will send the data as a special message to sql guard with all the information (taken from table 1). The reason a special message is better rather than piggy backing on the request is that Leonid may throw this away for whatever reason—so we want to make sure this arrives and is processed accordingly.

Upon a clearing event (either because a socket was closed or a thread died—i.e. whenever an entry from table 2 is removed) we send a "release" event to sql guard and it does a release of the app user information for that database session.

Alternate configurations may employ a multi-tier arrangement in which the IPC mechanism spans multiple applications and/or systems. In a multi-tier configuration, it is beneficial if there is a 1-1 thread correspondence between the different tiers and if they use sockets, pipes, or another IPC mechanism with discernable endpoints).

The multi-tier case invokes more complex processing than the single tier case. The tier closest to the user will behave like the application server stap described above but will not do "back-end" interception. Instead, whenever it sees that a socket connection is created to the next tier it will send an stap-to-stap message (new thing) to tell it to associate the client information with this new incoming endpoint. Tier 2 for example will do this same thing (e.g. if Tier 3 is the application server talking to the database). It will use the thread-id to know which outgoing socket is associated with which incoming socket. It uses the data it receives from Tier 1 to know which message to send to Tier 3. Tier 3 associated this user data with the application requests as described in the previous case.

Those skilled in the art should readily appreciate that the programs and methods for identifying propagated attributes between tiers as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for identifying propagated attributes between tiers has been particularly shown and described with references to embodiments thereof, it will be understood by those skilled in the art that various changes in form and details may be made therein without departing from the scope of the invention encompassed by the appended claims.

What is claimed is:

1. A computer-implemented method for propagating attributes comprising:
  receiving a request to perform a processing operation at a computer system including an operating system, the request including an attribute indicative of an initiator of the request;
  determining a processing thread associated with the request via the operating system, the processing thread operable to service the request;
  identifying a processing operation performed by the determined processing thread for satisfying the request;
  matching the processing operation to the request by identifying the processing thread common to the request and the processing operation, the common processing thread identified by intercepting in relation to an incoming port of the computer system a system call of the operating system to receive the request and intercepting in relation to an outgoing port of the computer system a system call of the operating system to perform the processing operation; and mapping the common processing thread associated with the request to the processing operation being performed to service the request.

2. The method of claim 1 wherein the request corresponds to an attribute indicative of a responsible user and the processing operation includes a database call to access a database for satisfying the request.

3. The method of claim 2 wherein the attribute is a user identifier, further comprising receiving a user credential indicative of an operator corresponding to the user identifier.

4. The method of claim 1 wherein mapping further comprises:
identifying the attribute of the request;
storing an association of the attribute and the common processing thread; and
detecting a successive application function performed by the common processing thread as corresponding to the identified attribute.

5. The method of claim 4 wherein receiving the request and performing the processing operation occur on different application tiers, further comprising performing the processing operation on a tier in which the attribute is unavailable via propagation to the tier performing the processing operation.

6. The method of claim 4 wherein the request further comprises an inbound request including at least one of a connection request and a data request, the inbound request directed to a predetermined set of connections through which requests are channeled.

7. The method of claim 6 wherein the system call of the operating system to perform the processing operation is an outbound call to an outbound IPC portal operative to perform application functions on behalf of the identified attribute.

8. The method of claim 7 wherein intercepting the outbound call further comprises:
intercepting an invocation to a system routine for accessing the outbound IPC portal; and
matching the processing thread performing the outbound IPC portal access with the processing thread servicing the inbound request to perform application functions.

9. The method of claim 1 wherein receiving the request further comprises intercepting invocations to a system routine for instantiating the processing thread, the processing thread operable to perform a read via an interface resource to which the request is directed, receiving further comprising scrutinizing requests for at least one of a connection request and a query request.

10. The method of claim 7 wherein intercepting the outbound IPC portal access further comprises:
watching write operations to a port associated with the database, the port accessible via a socket responsive to the processing thread; and
identifying a user identifier corresponding to the processing thread, the processing thread assigned by the operating system for servicing the inbound request.

11. The method of claim 6 wherein matching the processing operation to the request further comprises:
listening to a set of ports designated as interface resources operable for database access and to a set of ports designated as interface resources operable for application requests;
intercepting a connection request to a socket bound to one of the ports in the set of ports designated as the interface resources operable for application requests as issued on behalf of a user;
determining the thread for servicing the connection request, the thread operable to service successive data access requests emanating from the same user; and
intercepting successive data access requests by watching socket writes to ports associated with the database made by the determined thread.

12. The method of claim 6 wherein the connection request includes a credential indicative of a user, further comprising:
retrieving user identification information from the credential;
identifying a session token corresponding to the user identification;
identifying successive data access requests corresponding to the session token; and
mapping the identified successive data access requests to the user via the session token.

13. The method of claim 6 wherein following intercepting an inbound connection request and identifying corresponding outgoing database requests, the corresponding outgoing database requests are performed by the same thread as the inbound request.

14. The method of claim 13 further comprising:
identifying incoming IPC mechanisms through which application requests emanate from a user;
identifying outgoing IPC mechanisms through which the database requests to the database are made; and
identifying the incoming and outgoing IPC mechanisms includes identifying a port against which a socket operation was executed.

15. A computer program product having a computer readable memory device storing an encoded set of processor based instructions that when executed by said processor perform a method of user identification via attribute propagation comprising:
receiving, from a user, a request to perform a function of an application;
extracting an attribute from the request;
intercepting in relation to an incoming port of the processor an inbound system call to service the request by an interprocess communication (IPC) portal;
determining, from the intercepted system call, a processing thread assigned to service the request;
watching operations performed by the assigned processing thread to capture database access attempts by the assigned processing thread;
intercepting in relation to an outgoing port of the processor an outbound system call to access the database by the assigned processing thread;
mapping the processing thread to the extracted attribute in the inbound system call;
associating the attribute to the access made by the assigned processing thread; and
logging the association of the database access attempt to the mapped attribute.

16. The computer program product of claim 15 wherein watching further comprises:
establishing a front end responsive to system calls;
filtering system calls by identifying calls made to access IPC portals associated with the database made by a watched processing thread; and
computing the processing thread assigned in response to the system calls.

17. The computer program product of claim 15 wherein intercepting the inbound system call to an IPC portal further comprises:
identifying a port employed by the requests to access the application;

identifying a request to bind a socket to the identified port; and receiving connection requests on behalf of a user directed to the identified port.

18. A data security device for tracking database access attempts comprising:
a computer system comprising:
an operating system;
a monitor operable to receive an application request to perform an application function, the application request including an attribute;
a thread table operable to determine a processing thread associated with the application request, the processing thread operable to service the application request;
an interface to an interception layer operable to identify a database call performed by the determined processing thread for satisfying the application request via database access; and
a mapper operable to map the attribute to the database calls caused when servicing the request by identifying the processing thread common to the application request and database call, the common processing thread identified by intercepting in relation to an incoming port of the computer system a system call of the operating system to receive the request and intercepting in relation to an outgoing port of the computer system a system call of the operating system to send the database call, the mapper further operable to employ the thread table to map the common processing thread with the attribute included in the application request.

19. The device of claim 18 wherein the application request further comprises an inbound request including at least one of a connection request and a data request, the inbound request directed to a predetermined set of interface resources through which database access attempts are channeled.

20. The device of claim 19 wherein the database call is an outbound database call to an outbound IPC portal operative to access data in the database on behalf of a user corresponding to the attribute included in the application request.

21. The device of claim 20 wherein the interface for identifying the database call is further operable to:
intercept an invocation to a system routine for accessing the outbound IPC portal; and
match the processing thread performing the outbound IPC portal access with the processing thread performing the inbound application request.

22. The device of claim 19 wherein the monitor is operable to receive the application request by intercepting invocations to a system routine for instantiating the processing thread, the processing thread operable to perform a read via the interface resource to which the request is directed, receiving further comprising scrutinizing the application requests for at least one of a connection request and a query request.

23. The device of claim 20 wherein the interface to the interception layer is further operable to:
watch write operations to a port associated with the database, the port accessible via a socket responsive to the processing thread, wherein the monitor is operable to identify a user identifier corresponding to the processing thread, the processing thread further assigned by the operating system for servicing the inbound request.

24. The device of claim 20 wherein the monitor is further operable to:
listen to a set of ports designated as interface resources operable for database access;
listen to a set of ports designated as interface resources operable for application requests;
intercept a connection request to a socket, the socket bound to one of the ports in the set of ports designated as the interface resources operable for application requests, issued on behalf of a user;
determine the thread for servicing the connection request, the thread operable to service successive data access requests emanating from the same user; and
intercept successive data access requests by watching socket writes to ports associated with the database made by the determined thread.

25. The device of claim 20 wherein the connection request includes a credential indicative of the user, and wherein the monitor is further operable for:
retrieving user identification information from the credential;
identifying a session token corresponding to the user identification;
identifying successive data access requests corresponding to the session token;
mapping the identified successive data access requests to the user via the session token, such that following intercepting an inbound connection request and identifying corresponding outgoing database requests, the corresponding outgoing database requests are performed by the same thread as the inbound request; and
logging the data access requests correlated with the mapped user.

26. A computer program product having a computer readable memory device storing computer program logic embodied in computer program code encoded thereon for tracking database access comprising:
computer program code for receiving at a computer system with an operating system a request to access a database, the request including a user identifier;
computer program code for determining a thread associated with the request, the thread operable to service the request;
computer program code for identifying a database call performed by the determined thread for satisfying the request via database access;
computer program code for matching the database call to the request by identifying a thread common to the request and the database call, the common thread identified by intercepting in relation to an incoming port of the computer system a system call of the operating system to receive the request and intercepting in relation to an outgoing port of the computer system a system call of the operating system to perform the database access; and
computer program code for correlating the identified thread with the user identifier to identify the user responsible for the database access.

27. The computer program product of claim 26 further comprising computer program code for logging the database access correlated with the responsible user.

* * * * *